July 2, 1935.  C. W. VOGT  2,006,375
METHOD OF AND APPARATUS FOR FORMING ENWRAPPED BARS
OF A COMESTIBLE OR PLASTIC MATERIAL
Filed Aug. 11, 1932   8 Sheets-Sheet 1
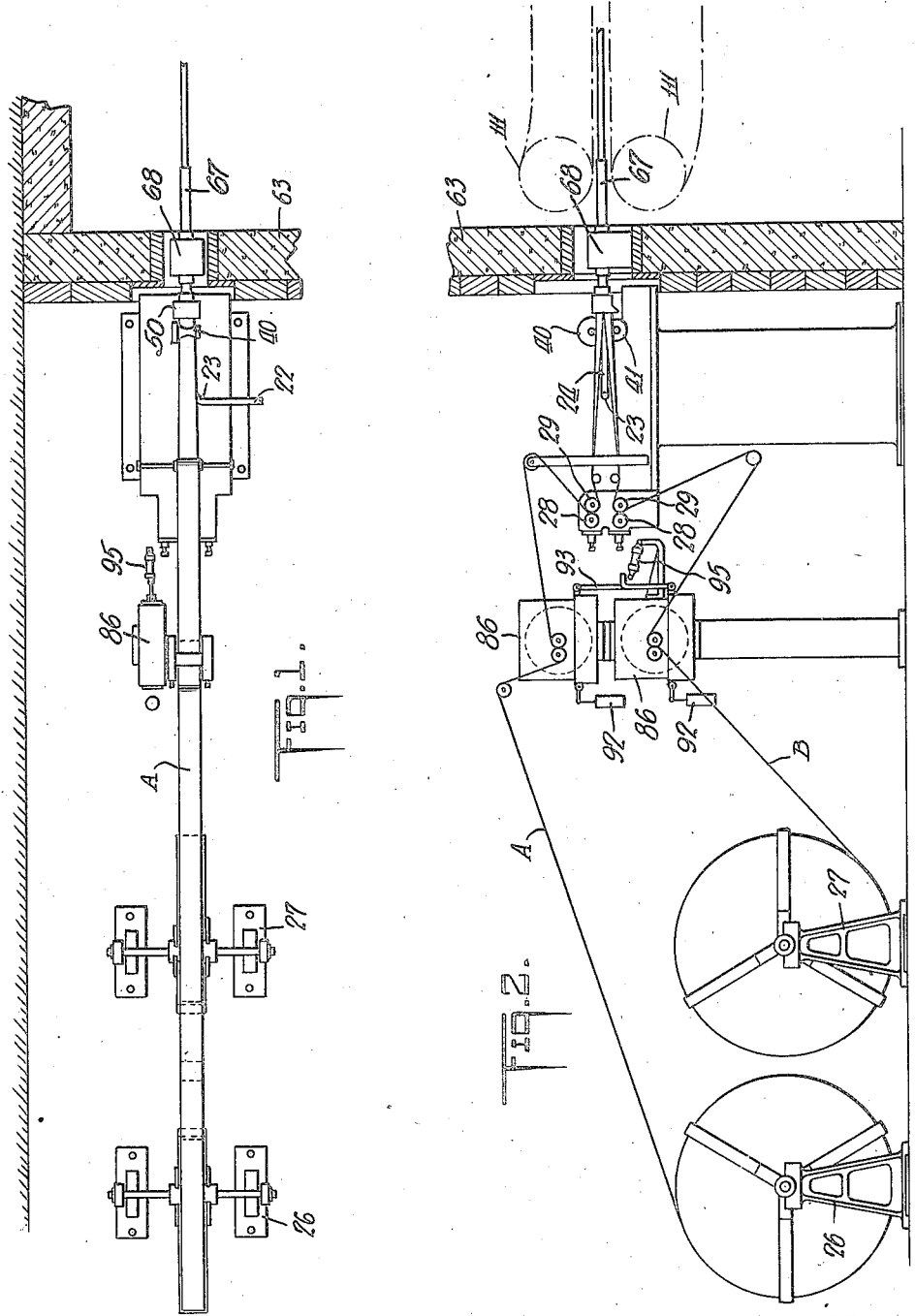
INVENTOR
Clarence W. Vogt
BY
ATTORNEYS

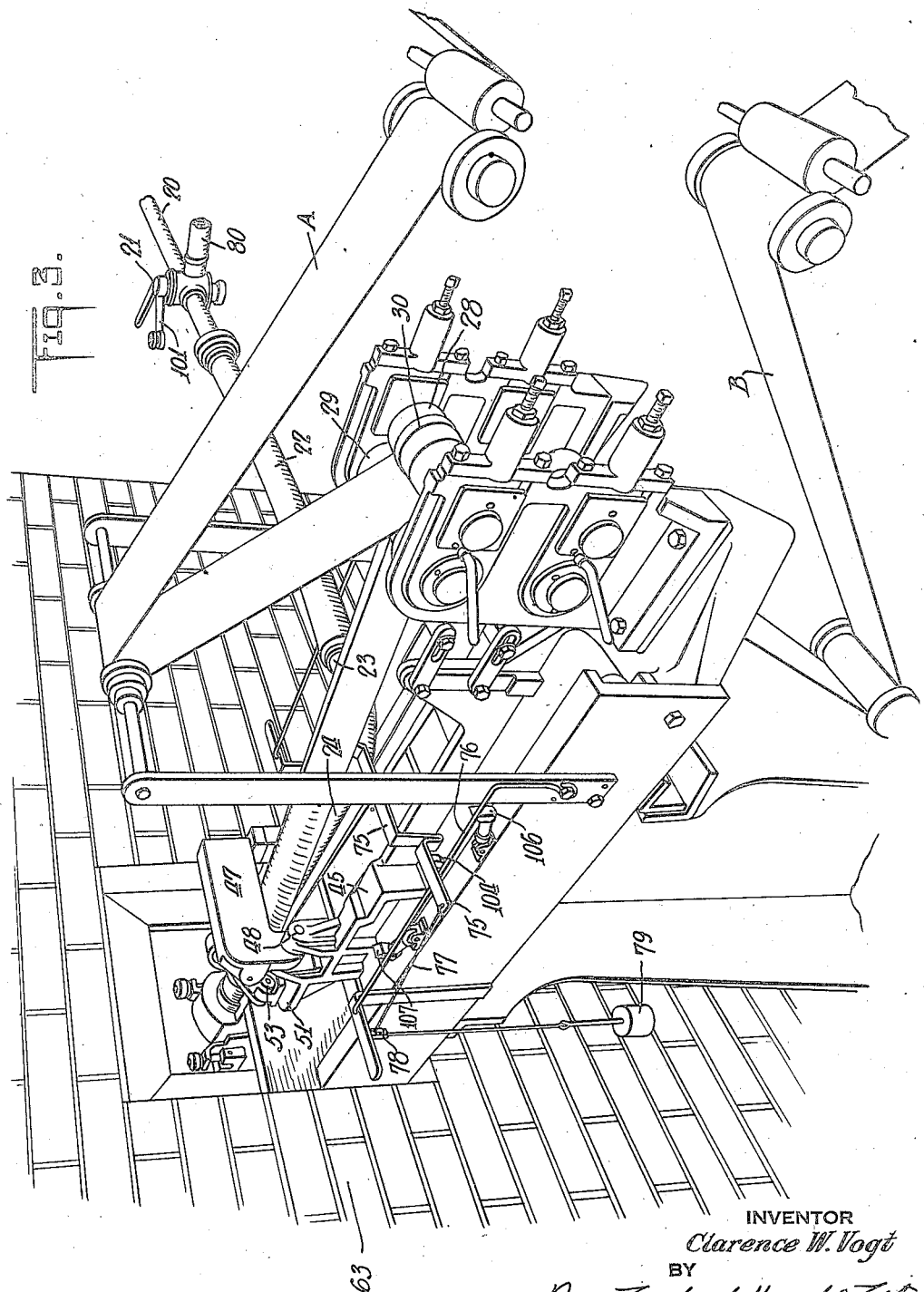

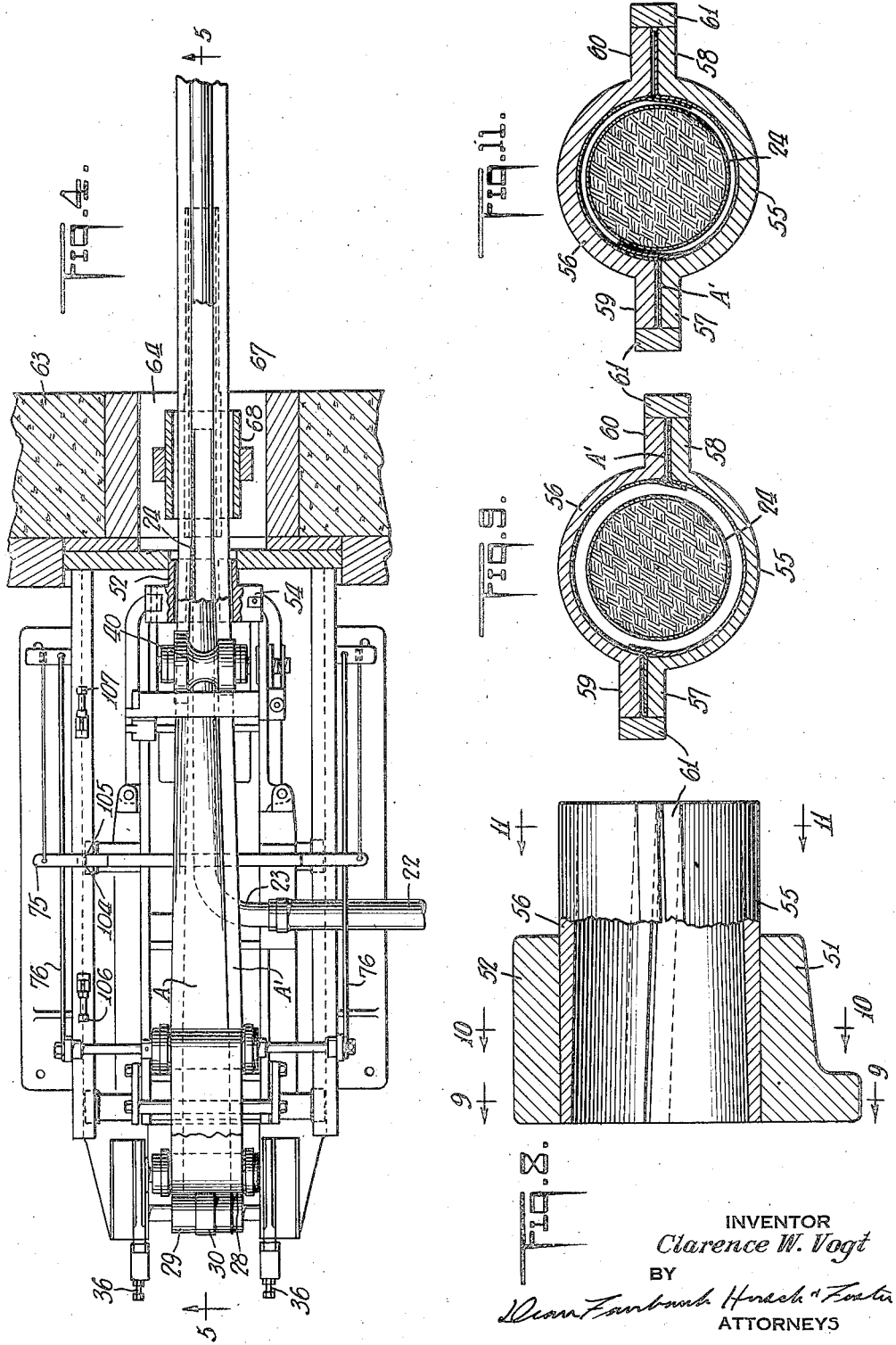

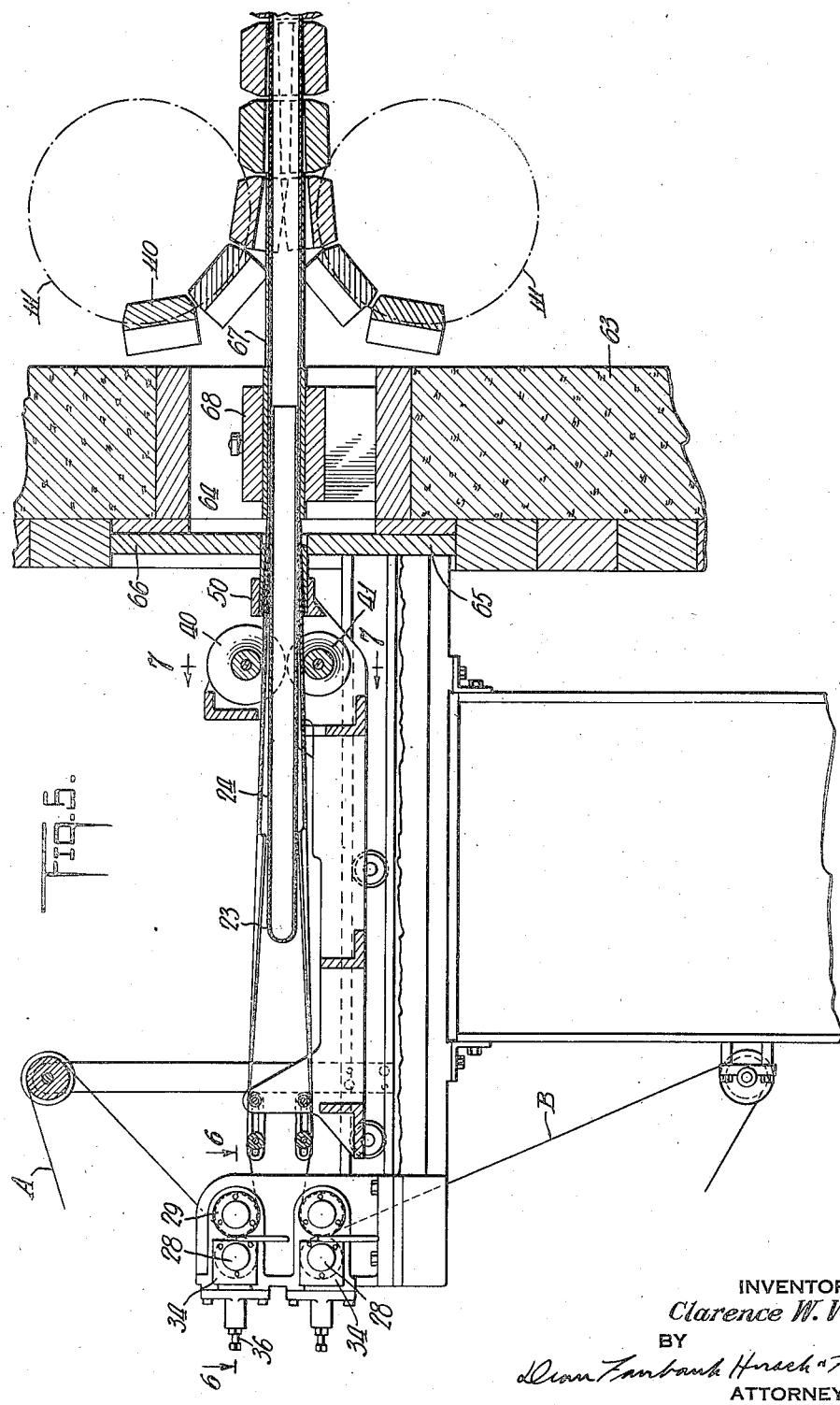

July 2, 1935. C. W. VOGT 2,006,375
METHOD OF AND APPARATUS FOR FORMING ENWRAPPED BARS
OF A COMESTIBLE OR PLASTIC MATERIAL
Filed Aug. 11, 1932 8 Sheets-Sheet 5
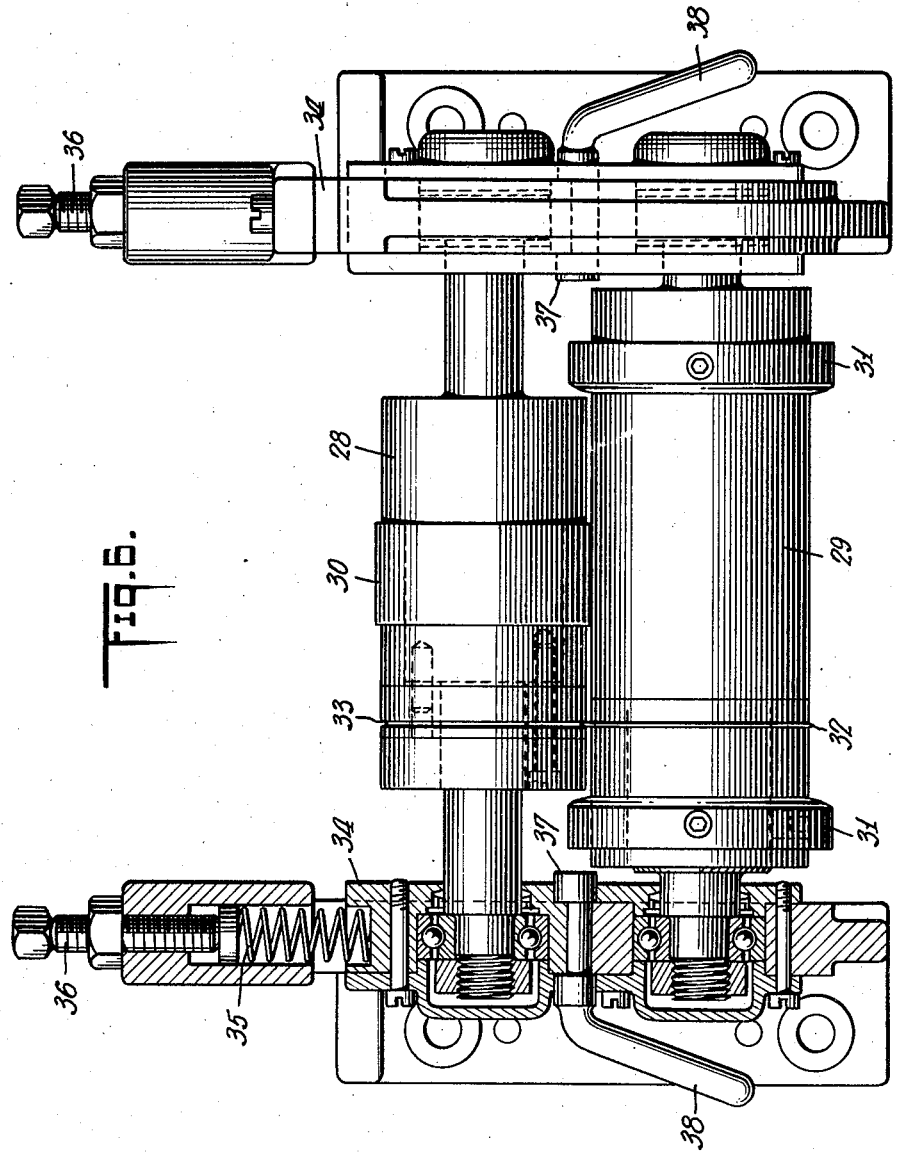
INVENTOR
Clarence W. Vogt
BY
ATTORNEYS

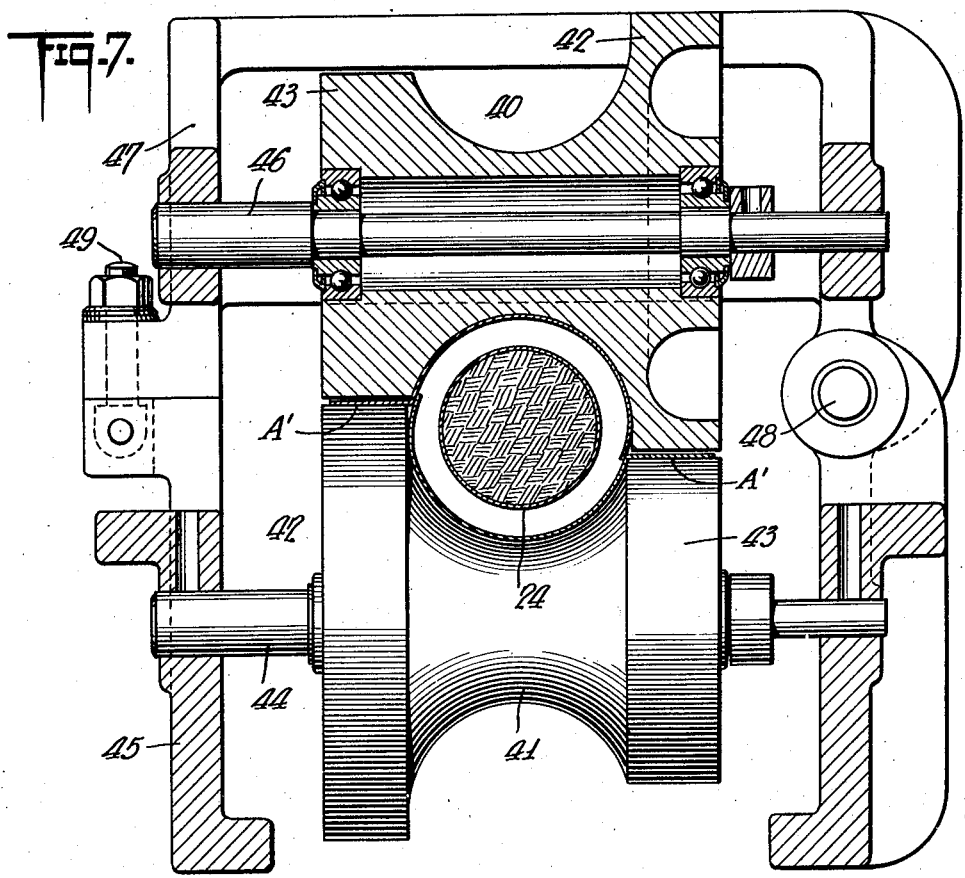
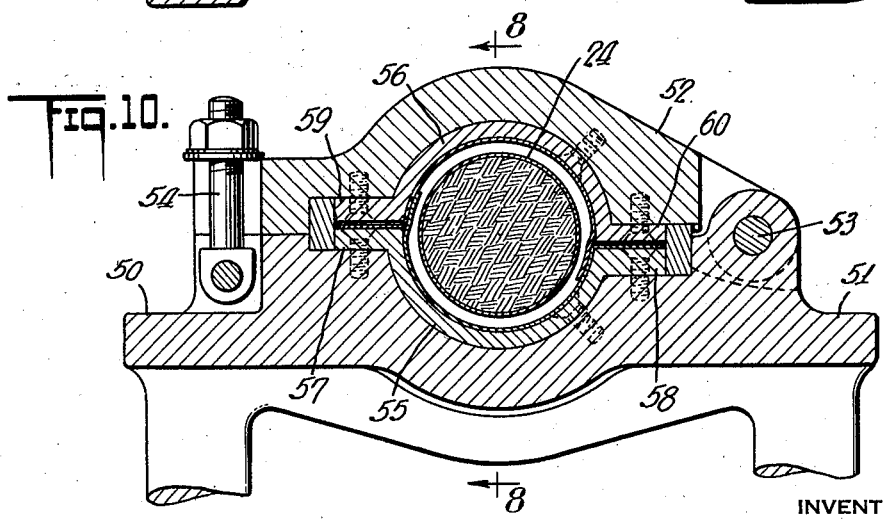

July 2, 1935.  C. W. VOGT  2,006,375
METHOD OF AND APPARATUS FOR FORMING ENWRAPPED BARS
OF A COMESTIBLE OR PLASTIC MATERIAL
Filed Aug. 11, 1932    8 Sheets-Sheet 7
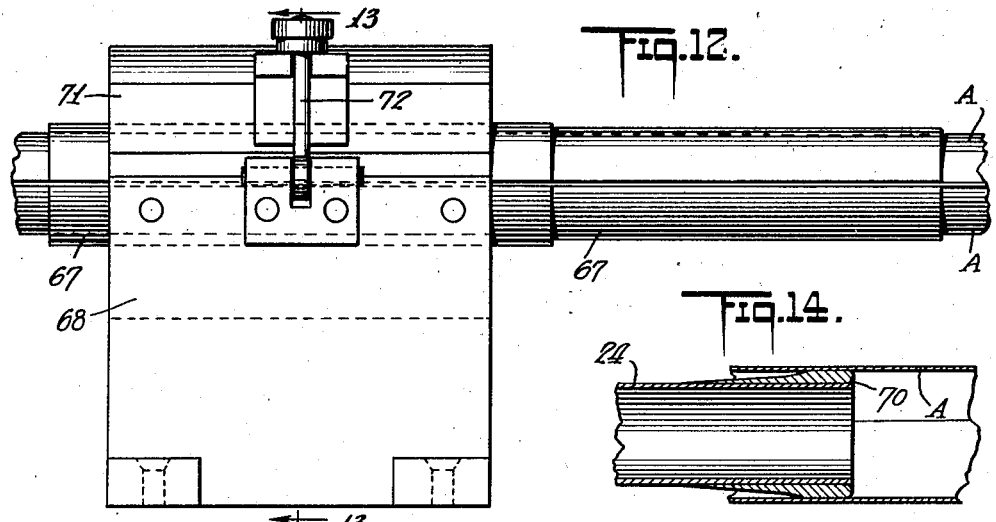
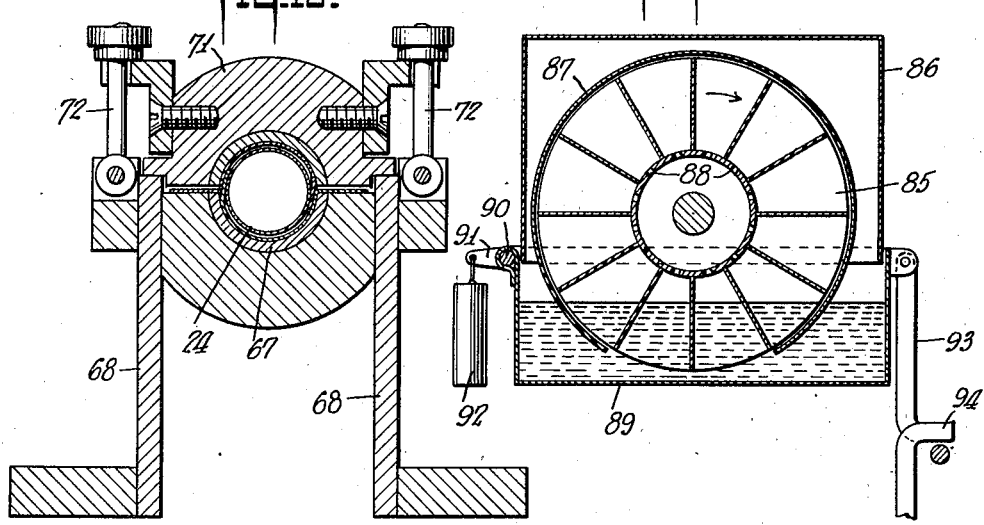
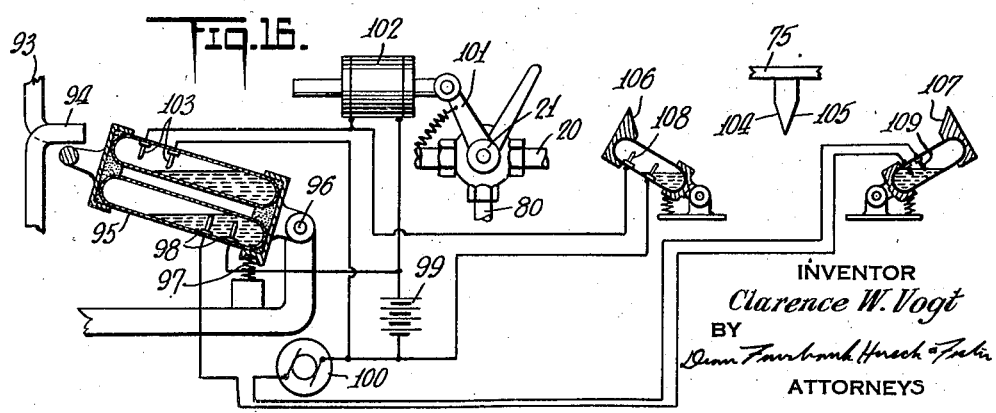
INVENTOR
Clarence W. Vogt
BY
ATTORNEYS July 2, 1935.  C. W. VOGT  2,006,375
METHOD OF AND APPARATUS FOR FORMING ENWRAPPED BARS
OF A COMESTIBLE OR PLASTIC MATERIAL
Filed Aug. 11, 1932   8 Sheets-Sheet 8
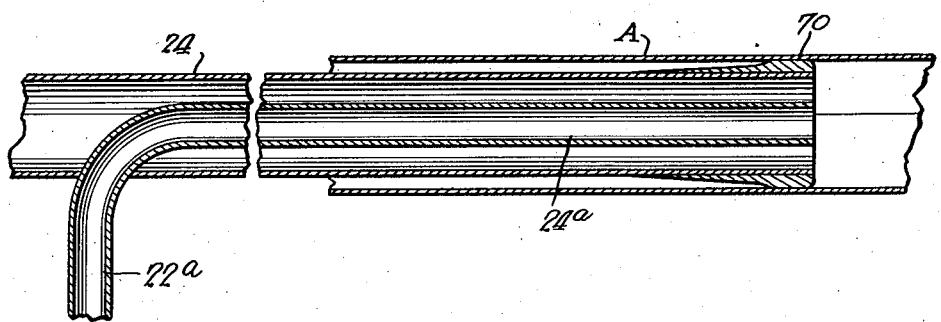
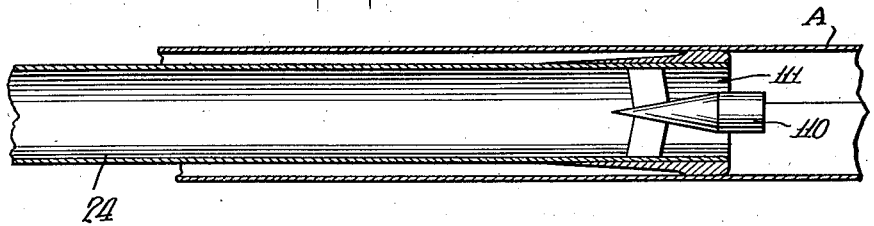
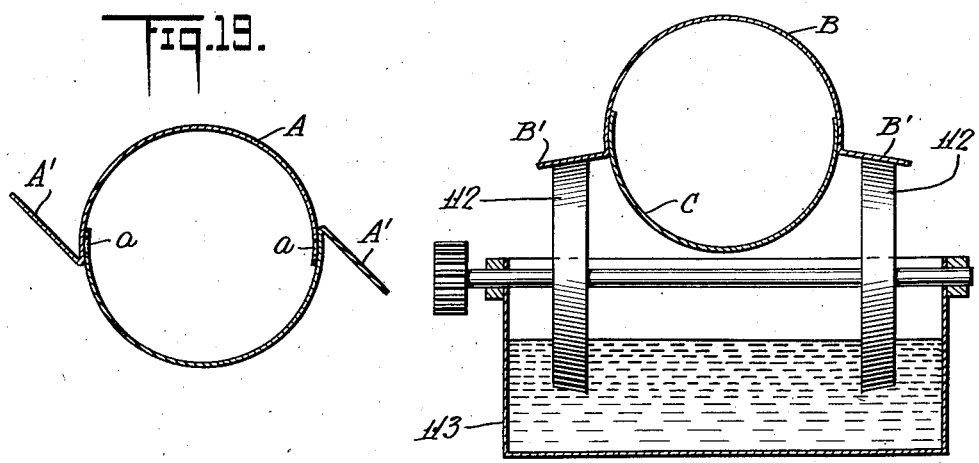
INVENTOR
Clarence W. Vogt
BY
ATTORNEYS Patented July 2, 1935

2,006,375

UNITED STATES PATENT OFFICE 2,006,375

METHOD OF AND APPARATUS FOR FORMING ENWRAPPED BARS OF A COMESTIBLE OR PLASTIC MATERIAL

Clarence W. Vogt, Louisville, Ky., assignor, by mesne assignments, to Vogt Processes, Incorporated, Louisville, Ky., a corporation of Delaware Application August 11, 1932, Serial No. 628,322

33 Claims. (Cl. 93—3)

This invention relates to improvements in mechanism for continuously forming an endwise advancing bar or rod of enwrapped or encased material, which bar or rod may be cut into sections of the desired length.

In carrying out my invention I continuously form a tube of wrapping material and continuously deliver plastic material to the tube as it is being formed.

Although my improved mechanism might be employed for the delivering and encasing of various materials, I have in mind particularly ice cream, water ice, sherbet or other frozen or partially solidified comestibles which are liquid at room temperature.

The apparatus is an improvement on that disclosed and broadly claimed in my prior Patents 1,810,740 and 1,810,863, issued June 16, 1931, and may be used as a part of the mechanism for carrying out the process disclosed and broadly claimed in my prior Patent 1,810,864.

In the specific form illustrated it may be employed in the production of the specific product disclosed in my Patent 1,906,183, issued April 25, 1933. For simplicity in explaining the process and apparatus, I will refer only to ice cream, but as above indicated the process and apparatus are not limited to that specific material.

The material to be encased is continuously delivered from a suitable apparatus which, in the case of ice cream, partially freezes it to a comparatively stiff, plastic form, and incorporates the required amount of air to give the desired overrun. Such an apparatus may be that disclosed in my prior Patents 1,783,864, 1,783,865, 1,783,866 or 1,783,867, issued December 2, 1932, or Patent 1,847,149, issued Mar. 1, 1932, or that disclosed in my copending application Serial No. 602,157.

As one important feature of my present invention the wrapping material is delivered as strips from two separate sources of supply, and these strips are so bent that each covers approximately one-half of the perimeter of the bar of material which is to be encased.

As another important feature the wrapping material is so delivered and so formed into the encasing tube that flaps or extensions project from opposite sides of the tube, and which may be used in pulling off the wrapping material after the hardened bar is cut transversely into sections.

As another important feature the wrapping material is progressively bent to form the tube, and the plastic material is delivered through a conduit terminating at a point beyond that at which the edges of the separate strips come together to form the tube.

As another important feature the tube is held in position around the material until the tube is grasped, supported around its periphery and advanced by suitable conveying mechanism which applies or permits of the application of the refrigerating agent to further solidify the material.

As another feature the relative rates of delivery of the filling material and the wrapping material are automatically controlled so that the filling material will completely fill the tube or wrapper at the proper rate to insure the formation of a uniform product without air pockets, and without overfilling or bulging the tube.

The specific form of the apparatus shown in the accompanying drawings and hereinafter described, involves various other important features which will be apparent from a consideration of this specific form or will be hereinafter pointed out.

In the drawings:

Fig. 1 is a diagrammatic top plan view of the apparatus.

Fig. 2 is a side elevation of the apparatus shown in Fig. 1, and also somewhat diagrammatically illustrated.

Fig. 3 is a perspective view of a portion of the apparatus.

Fig. 4 is a plan view corresponding to a portion of Fig. 1, but on a larger scale and more in detail.

Fig. 5 is a vertical longitudinal section taken substantially on the line 5—5 of Fig. 4.

Fig. 6 is a horizontal section on the line 6—6 of Fig. 5, but on a larger scale.

Fig. 7 is a vertical section on the line 7—7 of Fig. 5, but on a larger scale.

Fig. 8 is a side elevation partly in vertical longitudinal section, on the line 8—8 of Fig. 10, similar to a portion of Fig. 5, but on a larger scale and with the tube, material and filling conduit omitted.

Figs. 9, 10 and 11 are transverse sections on the lines 9—9, 10—10 and 11—11 respectively of Fig. 8, but showing the filling material, tube and filling conduit.

Fig. 12 is a side elevation of the support and guide for delivering the filled tube to the conveyor.

Fig. 13 is a transverse section on the line 13—13 of Fig. 12.

Fig. 14 is a longitudinal section through the terminal portion of the delivery conduit for the material.

Fig. 15 is a vertical section through a portion of the automatic control mechanism.

Fig. 16 shows certain other details of the control mechanism and the electric circuits.

Figs. 17 and 18 are sectional details showing other forms of the material delivering nozzle shown in Fig. 14.

Fig. 19 is a section through a slightly modified form of tube, and

Fig. 20 is a section through a further form of tube with adhesive applying means.

In the specific form illustrated the filling material is delivered through a conduit 20 having a three-way valve 21, to a flexible conduit 22, which latter is connected to an elbow 23 on the end of the filling conduit or nozzle 24. This filling conduit extends parallel to the direction of movement of the wrapping material and the wrapper is formed around this conduit and is progressively advanced endwise while the filling material is delivered through the filling conduit and from the end of the later directly into the tube or casing.

The wrapping material comprises two strips, A and B, of flexible sheet material, such for instance as paper, which are drawn from supply rolls mounted on suitable standards 26 and 27. Each strip is of a width slightly greater than one-half the perimeter of the tube to be formed, and the mechanism which delivers the strip material bends a portion of the strip to substantially semi-cylindrical form, and leaves one edge portion of the strip extending outwardly as a tab or flap to project from the side of the finished product. Each strip after passing over one or more idlers passes between a pair of creasing or guiding rollers 28 and 29 (see Fig. 6), one of which may have a portion 30 of its surface of rubber or other suitable material which will prevent any substantial slippage of the strip between the rollers. One of the rollers may have a pair of spaced peripheral flanges 31 acting as guides for the edges of the strips, and between which flanges the other roller extends. The two rollers have coacting means for creasing the strip adjacent to one edge. This is shown as a narrow collar or flange 32 on one roller, entering a groove 33 in the other roller. To facilitate feeding of the strips to the proper position for starting operations, one of the rollers, for instance the roller 29, may be mounted in stationary bearings, while the other roller may be mounted in bearing blocks 34 which are slidable and normally pressed toward the bearings of the roller 29 by springs 35, the tension of which may be adjusted by screws 36. The bearing blocks 34 may be forced outwardly against the action of the springs by cams or eccentrics 37 operated by handles 38 so that the rollers may be separated to thread up the machine, and then be permitted to come together and be held together by the springs.

The strips after leaving the creasing and guiding rollers 28, 29, may pass over suitable idlers and then to the main forming rollers. These are shown, particularly in Fig. 7, as two superposed rollers 40 and 41, each having a substantially semi-cylindrical groove around the periphery and of a radius somewhat larger than the radius of the final desired product. Each roller has a flange 42 at one end and a flange 43 of smaller diameter at the opposite end, and the two rollers are in reverse position so that the large flange of one comes in the same plane as and closely adjacent to the small flange of the other.

The wrapper strips are so guided to these rollers that a marginal portion A' of one of the strips is gripped between one pair of flanges 43—43 and the corresponding marginal portion A' of the other strip is gripped between the other two flanges 43—43, but the marginal portions of the two strips are not in the same plane.

The creases which were formed in the strips by the flange and groove 32, 33 come in registry with the edges of the flanges 43 and 43 of the rollers 40, 41, and the body portion of each strip is bent to substantially semi-cylindrical form by the grooves in the two rollers. The edge of each strip opposite the marginal portion A' is caused to lie adjacent to the inner surface of the semi-cylindrical portion of the other strip. The tube thus formed by the rollers is of somewhat larger diameter than the final product to be formed, and the conduit or nozzle 24 through which the material is delivered extends between the two rollers 40, 41, as shown in Fig. 7, but is not supported by either of them.

The lower roller 41 is carried by a shaft 44 journaled in a frame part 45, while the upper roller is journaled on a shaft 46 which is carried by a frame part 47 pivoted to the frame part 45 so that the rollers may be readily separated in threading up the machine. As shown, the two frame parts 45 and 47 are connected by a pivot pin 48 at one side and by a bolt 49 at the other.

Directly beyond the rollers 40, 41 is a guide 50 shown in Figs. 4 and 5 and more particularly in Figs. 8, 9, 10 and 11. This includes a frame part 51 which may be integral with the frame part 45, and an upper frame part 52 which may be connected to the frame part 51 by a pivot pin 53 at one side and a bolt 54 at the other. Thus the upper frame part may be moved out of position to facilitate threading of the machine. The two frame parts 51 and 52 carry two approximately semi-cylindrical guide sections 55 and 56 which combine to form a tube somewhat larger than the conduit 24, and acting to hold the wrapper in tubular form and gradually reduce the diameter thereof.

At opposite sides of the guide sections 55 and 56 are lateral flanges for guiding the marginal portions A' of the wrapper. The two flanges 57 and 58 of the lower guide section 55 are secured to the frame part 51, while the flanges 59 and 60 of the upper guide section are secured to the upper frame part 52. At the end of the guide 50 nearest to the roller 40 and 41, these pairs of flanges 57, 59 and 58, 60 are at such elevations that the space therebetween is opposite the approximate line of tangency of the two pairs of flanges 42, 43 on the two rollers. The flanges on one side are thus at a higher elevation than those at the other. The flanges are inclined so that at the delivery end of the guide sections 55, 56 these flanges are at approximately the same elevation, as shown in Fig. 11. The raising of the edge portion A' of one strip and the lowering of the other to bring the two portions into the same plane does not act to rotate the wrapper as a whole, but acts to gradually reduce the diameter thereof. The internal diameter of the tubular guide 55, 56 is of gradually decreasing diameter from the receiving end to the delivery end, as shown in Fig. 8, and in Figs. 9, 10 and 11. At the outlet end of the guide the diameter of the tube has been contracted so that it is only slightly larger than the delivery conduit 24. One of the flanges of each pair has an edge portion 61 which prevents any outward lateral movement of the portions of the wrapper strips.

The parts so far described are mounted outside of the hardening chamber, but the guide 50 is preferably positioned closely adjacent to the entrance of said chamber. One wall 63 of the hardening chamber is shown in Figs. 4 and 5, and the guide 50 is preferably positioned closely adjacent to the entrance opening 64 through this wall. The guide section 55 may rest upon the lower section 65 of a closure for this opening, and a removable section 66 of the closure may be mounted above the guide so as to close the opening when the apparatus is in operation.

Preferably supported within the opening 64 and by the wall 63 is a further guide for holding the wrapper closely adjacent to but slightly spaced from the body of the filling conduit 24, and guiding this wrapper to a point beyond the end of said conduit where the wrapper is filled and the wrapper with its filling material is gripped by conveying mechanism. This guide includes a guide tube 67 rigidly held in place by a bracket 68 and having a comparatively thin wall particularly at its delivery end. This guide tube closely engages the outer surface of the wrapper and is provided with longitudinal slots on opposite sides for receiving the marginal strips A' of the wrapper, and is preferably made of two sections which may be readily separated to facilitate threading up of the machine and cleaning. As shown particularly in Figs. 12 and 13, the bracket 68 includes an upper section 71 which is held in place by a pair of bolts 72 which may be loosened to remove this upper section and the upper half of the guide tube 67 carried thereby.

To reduce friction the wrapper is not contracted by the guide 50 to such an extent as to closely engage the outer surface of the conduit 24, but is left of slightly larger diameter than said conduit. The conduit 24 at its delivery end has the wall thereof thickened or expanded so as to support the wrapper as shown at 70 in Fig. 14, and to prevent the material delivered from the end of the conduit, from flowing back along the outer side of the conduit.

The material delivered through the conduit 24 contains a large amount of air dissolved or uniformly dispersed therein, and is under some compression so that as it escapes from the end of the conduit 24 it expands and completely fills the wrapper. If the material does not contain any air and is therefore non-expansible, said material may be delivered through the conduit 24 at a slightly faster rate than the rate of advancement of the wrapper, so that it will spread out and completely fill the wrapper, and its rate of advancement slow down to that of the wrapper. Although the conduit 24 may move back and forth endwise in respect to the guide tube 67 as hereinafter described, its length is such that in any adjusted position it terminates intermediate of the ends of said guide tube.

In the operation of the machine it is important that the rate of delivery of material to the tube be so controlled that the tube will be completely filled as fast as it is formed, and without danger of rupturing or expanding the tube or leaving air pockets within the tube.

I have shown two means for accomplishing this control. The conduit 24 may be moved endwise during the operation of the apparatus, in accordance with the rate of delivery of the material through the conduit, and also a portion of the material being delivered may be permitted to escape from the supply conduit at the three-way valve 21. Either or both of these control means may be employed, or other means may be designed for accomplishing the same result.

To facilitate the endwise movement of the conduit or nozzle 24, the latter is connected through the elbow 23 to the flexible conduit 22, as above described, and the rear or outer end of the conduit 24 may be secured to a transverse bar 75 having end extensions slidable upon parallel guides 76. This bar supports the outer end of the conduit 24 and holds it in proper centralized position in respect to the grooves in the wrapper forming rollers 40, 41.

The opposite ends of the bar 75 are connected to cables 77 which extend over rollers 78 to weights 79. These weights tend to pull the conduit endwise and force it to the inner limiting position. As this conduit at its delivery end closely fits the wrapper, which latter is supported peripherally by the guide tube 67, it will be evident that if the material is delivered through the conduit 24 faster than is required to fill the wrapper at the rate at which the latter is formed, a back pressure will develop which will tend to force the conduit 24 outwardly against the action of the weights 79. Thus these weights serve to maintain a substantially definite and constant pressure on the material at the point where it emerges from the nozzle 24, and directly enters the wrapper. The operator may watch the position of the weights 79 or the conduit 24, and when the latter has been moved out to any predetermined distance and is continuing to move out, he may adjust the drive of the conveyor which is advancing the material in the hardening room, so as to speed up the movement of the wrapper, or he may adjust the driving mechanism of the pump or primary freezer to slow down the rate of delivery of the material. Instead of doing either he may adjust the three-way valve 21 so that a portion of the material delivered through the conduit 20 may be permitted to escape through an outlet 80. This escaping material is not wasted, but may be returned to the source of supply so that it in effect constitutes a by-pass. The end of the conduit or nozzle 24 acts as a piston or flange in the wrapper tube and is continuously pressed inwardly by the weights and the limit is fixed by the material already delivered. Thus complete filling is insured.

To secure an automatic control I may employ a mechanism, a portion of which is indicated in Fig. 2, and which is shown more in details in Figs. 15 and 16. The shaft of the creasing roller 29 may be provided with a bucket wheel 85 mounted to rotate in a casing 86 adapted to contain a liquid. Within this casing is a wall 87 closely adjacent to a portion of the periphery of the bucket wheel, so that as the wheel rotates in a clockwise direction, as shown in Fig. 15, the buckets will pick up liquid and lift it to a position above the axis of the wheel. Each bucket or pocket has a drainage outlet 88 at its radially inner end so that when the liquid has been raised to a predetermined position it may begin to drain out and flow back into the casing or liquid chamber 89. The design is such in respect to the minimum rate of rotation that about half of the liquid will drain out of each bucket by the time that bucket reaches a point directly above the axis of the wheel. At the maximum rate much less than half will drain out.

The casing 86 is made of two sections, the lower section 89 serving as a reservoir, being vertically movable and the two sections meeting in a plane below the axis of rotation of the wheel. The wheel is journaled in the upper casing which is stationary, and the lower section 89 is counter balanced so as to rise or fall, depending upon the amount of liquid supported thereby independent of the wheel. The liquid in each pocket will drain out at a fairly constant rate, irrespective of the rate of rotation of the pocket as long as this rate is so slow as to not be held outwardly and upwardly by centrifugal force. Thus an increase in the rate of rotation will cause a larger amount of the liquid to be in the pockets and supported by the wheel at any particular instant, and there will, of course, be a correspondingly smaller amount of liquid supported by the lower casing section 89. This casing section will therefore rise or fall depending upon the rate or rotation of the wheel. This wheel, of course, rotates at the same rate as the wrapper material is delivered, because it is connected to one of the two rollers which are rotated by the wrapper material and act to crease the latter.

The liquid chamber 89 may be movably supported in any suitable manner, but merely as an example I have shown it hinged to the upper section of the casing by a pivot 90 at one side, so that the other side may rise or fall in the limited swinging about said pivot. The liquid chamber may be provided with an arm 91 extending outwardly from the pivot 90, and this arm may carry a counterbalancing weight 92 which will hold the liquid chamber 89 in the upper limiting position except when practically no liquid is supported in the pockets of the wheel. The liquid employed may be of any suitable character, but preferably one which is substantially non-volatile at room temperature so that there will be little or no loss from this cause. As an example I may employ a high boiling mineral oil of the desired viscosity in respect to the size of the holes in the pockets.

In normal operation the bucket is in raised position and will remain in this position unless very little liquid is in the buckets. The proportions are preferably such that when the wheel comes to rest the liquid in the upper compartments may drain down into the trap or liquid compartment and cause the latter to descend. When the paper is actually feeding there is a sufficient minimum speed of travel of the paper to cause the wheel to revolve at a rate at which only a portion of the liquid empties from the pockets during the upper two-thirds of the arc of travel, which is that part above the normal liquid level. In case the paper should break the wheel would cease to turn, and in approximately one second after the wheel stopped sufficient extra liquid from the buckets will have drained into the liquid chamber to increase the weight of the latter and cause the chamber to drop.

The same type of wheel, liquid chamber and counter-balancing weight are employed in connection with the upper creasing roller 29 which is rotated by the upper paper strip, and the lower creasing roller 29 which is rotated by the lower strip, and the two movable liquid chambers may be connected by a bar 93 so as to move together, or they may independently operate the same mechanism which controls the conveyor in the hardening chamber. The connection is preferably an electrical one and may be such as is shown diagrammatically in Fig. 16. The bar 93 has a lug 94 disposed above the free end of a mercoid switch 95 mounted on a pivot 96 and held in raised position by a spring 97. In one mercury chamber are a pair of terminals 98 of a circuit which includes a source of electrical energy 99 and a motor 100 which operates the conveyor in the hardening chamber.

This circuit is merely diagrammatically represented, but it will be understood that in commercial installation a relay will ordinarily be employed so that the current passing between the terminals 98 will be of small volume and when this circuit is broken the power circuit of the motor will be likewise broken at the relay. By means of this mechanism a break in either paper strip will operate almost instantly to stop the conveyor in the hardening chamber.

The valve 21 which controls the supply of material to the conduit 24 may be controlled by the same mercoid switch. A lever 101 of the valve 21 is connected to a solenoid 102, and the mercoid switch at its normally upper end has a pair of terminals 103, at least one of which is normally above the level of mercury in the upper compartment of the switch. When the switch is tilted by the lowering of either of the liquid chambers 89, the circuit from the source of energy 99 through the solenoid 102 is closed at the terminals 103, and the valve 21 is instantly moved to by-pass the material to the outlet 80. Thus the breaking of the strip of paper not only stops the conveyor in the hardening chamber, but also stops the flow of material through the conduit 24.

In case the material is being delivered through the conduit 24 at such a rate as to move the conduit to an outer predetermined position, I utilize this movement of the conduit to control the valve 21 independently of any stopping or starting of the conveyor mechanism. The conduit or the bar 75 connected thereto may be provided with a pair of cams 104 and 105 facing in opposite directions and serving to depress mercoid switches 106 and 107 which are mounted in the path of movement of said cams. The mercoid switch 106 is pivoted and normally held in raised position by a spring, and at least one of its terminals 108 is normally out of contact with the mercury. If the conduit 24 is moved toward the left from the position shown in Fig. 16, that is outwardly in respect to the direction of flow of the material, the cam 104 will act on the switch 106 to depress the switch and close a circuit through the solenoid 102 and the source of electrical energy 99. This will interrupt the supply of material without stopping the conveyor, and the feeding of wrapping material. The interruption of the flow of material will permit the weights 79 to pull the conduit 24 inwardly and break the circuit at the switch 106 and permit the valve 21 to reopen. Thus the valve may be momentarily closed from time to time if the rate of the supply of the material is slightly greater than the rate of strip advancement, and the complete filling of the tube will be insured unless the material is being supplied at too low a rate.

The mercoid switch 107 is likewise pivotally supported and held in raised position by a spring, but the two terminals 109 are normally held in contact with the mercury. When the conduit or nozzle 24 moves to an extreme position toward the right from the position shown in Fig. 16, that is, in an inward direction in respect to the direction of paper feed, the cam 105 will force the switch 107 downwardly to break the electric circuit. The terminals 109 may be arranged in series with the terminals 98 of the switch 95, so that upon breaking the circuit by depressing either the switch 95 or the switch 107, the circuit of the motor 100 will be broken and the conveyor in the hardening chamber will be stopped. This stopping of the conveyor will stop the feed of paper and the bar 93 will drop to cause the closing of the circuit at the terminals 103, and the stopping of the supply of material through the valve 21.

From the foregoing it will be seen that breaking the paper stops the entire apparatus or a failure of an adequate supply of material through the tube 24 will likewise stop it, but an excess supply of material through the conduit 24 will merely act to open and close the valve 21 and permit a larger or smaller amount to be by-passed through the outlet 80 so that the apparatus will continue operation with the proper amount of material supplied thereto. When the apparatus is at rest it may be started by manually lifting the liquid chamber 89 to permit the mercoid switch 95 to raise and start the motor 100, and open the valve 21. It will be understood that the valve 21 or the solenoid is so constructed that the valve will automatically open when the circuit of the solenoid is broken. A spring, a counterbalancing weight, or other suitable means may be employed for this purpose.

The present invention does not include any of the details of the apparatus within the hardening chamber and which acts to advance the filled tube and refrigerate it to harden the material therein.

As previously noted such mechanism may be of the general type disclosed in my prior Patents 1,810,740, 1,810,863 and 1,810,864. Preferably it is of the type in which a pair of endless conveyors include or present shoes having substantially semi-cylindrical grooves therein to receive the encased material around substantially the entire periphery thereof, and with flanges to grip the extending flaps or marginal portions of the wrapper. These shoes may each have a plurality of fins whereby the heat extracted from the material is rapidly radiated to and absorbed by the low temperature air circulated in the hardening chamber. I have not shown the details of such a mechanism, as these are disclosed and claimed in copending application Serial No. 678,624, filed July 1, 1933.

In Fig. 5 I have illustrated somewhat conventionally two such endless conveyors having guide shoes 110 passing around pulleys 111. The guide tube 67 extends between the two pulleys 111 and terminates at a point slightly in advance of the nip of the two conveyors so that the encased material is supported about its periphery by the guide tube 67 and is unsupported for a very short distance between the end of the tube and the point where it is supported and gripped by the conveyors.

In the foregoing description I have considered the complete filling of the tube with material from a single source. It will, of course, be obvious that it may be delivered from a plurality of separate sources so as to form separate layers or sections of different material in the tube. For instance, the conduit may have a partition therein and disposed lengthwise thereof and different materials be delivered on opposite sides of the partition.

In Fig. 17 I have shown the terminal portion of the nozzle 24 with an annular partition in the form of an inner nozzle 24a which may be connected through one side of the nozzle at some distance back from the end, with a separate supply conduit 22a. Thus chocolate and vanilla or any other two flavors of ice cream may be delivered simultaneously, one forming a layer around the other. Ice cream may be delivered through one passage and water ice or sherbet through the other.

Instead of delivering both materials simultaneously I may deliver only the material forming the outer layer, and thus form a hollow enwrapped bar which after being cut into sections may be filled with the other material. In Fig. 18 I have shown the end of the nozzle 24 provided with a centrally flared plug 110 therein at the end thereof and spaced from the wall to form an annular outlet 111 delivering the material in tubular form in contact with the inner surface of the wrapper. The material may be comparatively stiff ice cream which will adhere to the wrapper and harden in the hardening room to form a tube of ice cream, or it may be chocolate to form a casing for an ice cream filling. After the hardening, the wrapper and material may be cut into short sections and the center filled with ice cream or other material.

Ordinarily the wrapper will adhere to the ice cream when the latter is frozen, but may be easily peeled off particularly when the ice cream is slightly softened and at the preferred temperature and hardness for eating. I may, if desired, provide each strip of the wrapper with a series of small holes closely adjacent to the edge thereof which is overlapped by the other strip adjacent to the flap A'. Thus the ice cream may enter these holes and freeze to the outer layer of the wrapper and form a more effective seal. In Fig. 19 I have shown the wrapper strips A provided with such apertures a.

In some cases it may be desirable to seal the strips together by an independent sealing material. In Fig. 20 I have shown a tube in which one of the strips B is made wider than the other C so that the two flaps or extensions B' are on the same strip. These two flaps may be caused to travel over adhesive applying rollers 112, dipping into an adhesive container 113, and separate rollers or guides may then press the flaps down against the sides of the lower strip C. This sealing may be done, particularly if cellophane or other such wrapping material is used. Such a tube would be formed around the conduit or nozzle for the filling material, but would require appropriate change in the details of the creasing and bending rollers for the wrapper strips.

In the various forms shown, the tube is substantially cylindrical, but by the term "tube" I do not wish to be limited to this particular cross-sectional form as the tube may be of different shapes dependent on the details of the tube forming mechanism, or of a shaper.

Having thus described my invention, what I claim as new and desire to secure by Letters Patent is:—

1. A tube forming and filling apparatus including a conduit for delivering the filling material, means for delivering a plurality of strips of wrapper material along said conduit and lengthwise thereof, a guide encircling said conduit and spaced therefrom for bringing said strips together to form the wrapper tube around the conduit with flap portions extending outwardly therefrom, and a pair of endless conveyers having portions spaced to receive the wrapper tube and portions for gripping said flaps to pull the wrapper strips through said guide and advancing the wrapper tube and filling material.

2. A tube forming and filling apparatus including a conduit for delivering the filling material, means for delivering wrapping material along said conduit and lengthwise thereof, a pair of guide sections having arcuate portions concentric with said conduit and coacting to fold said wrapper around said conduit to form the wrapper tube and also having spaced surfaces extending outwardly from said arcuate portions and coacting to form passages for marginal portions of said wrapper material, and means beyond said guide sections and movable in a direction substantially parallel to said conduit for gripping said marginal portions and thereby continuously advancing said wrapper tube and the filling material at a substantially uniform rate.

3. A tube forming and filling apparatus including a conduit for delivering the filling material, means for delivering wrapping material along said conduit and lengthwise thereof, a pair of guide sections having arcuate portions concentric with said conduit and coacting to fold said wrapper around said conduit to form the wrapper tube and also having spaced surfaces extending outwardly from said arcuate portions and coacting to form passages for marginal portions of said wrapper material, and a pair of endless conveyers having portions spaced apart to receive the wrapper tube and portions for gripping said marginal portions to pull the wrapper through said guide sections and advance the wrapper tube and filling material.

4. A tube forming and filling apparatus including a conduit for delivering plastic filling material, means for delivering wrapper material lengthwise of said conduit, guide means for gradually and progressively bending said wrapper material to form a tubular wrapper around the conduit and with outwardly extending flaps, and means beyond said guide means for continuously and progressively gripping said flaps to pull said wrapper material through said guide means and to advance said wrapper tube at substantially the same rate as the plastic material is delivered from said conduit.

5. A tube forming and filling apparatus, including a conduit having a substantially straight terminal section for delivering the filling material, means for delivering a plurality of separate strips of wrapper material along different sides of said conduit, means for bringing said strips together to form the wrapper around the conduit, and means beyond the end of the conduit for engaging with the wrapper material to continuously advance the latter with the material therein.

6. A tube forming and filling apparatus, including a conduit having a substantially straight terminal section for delivering the filling material, means for delivering a plurality of separate strips of wrapper material along different sides of said conduit, means for bringing said strips together to form the wrapper around the conduit and to form a flap extending lengthwise thereof, and means beyond the end of the conduit for engaging said flap to continuously advance the wrapper with the material therein.

7. A tube forming and filling apparatus including a conduit for delivering the filling material, a tubular guide encircling the same, and means for delivering a plurality of separate strips of wrapper material lengthwise of said conduit and within said tubular guide, said wrapper having flaps extending lengthwise thereof, along opposite sides and the tubular guide having slots along opposite sides to receive said flaps.

8. A tube forming and filling apparatus including a conduit for delivering the filling material, a separate conduit encircling the same, means for delivering wrapper material lengthwise of said conduits and between the two, and means for varying the relative speeds of advancement of the tube and filling material to insure complete filling of the tube.

9. A tube forming and filling apparatus, including a conduit for continuously delivering the filling material, a separate conduit encircling the same, and means for delivering wrapper material lengthwise of said conduits and between the two, the first mentioned conduit being normally substantially stationary, but movable endwise to control the rate of delivery of the material to the wrapper tube.

10. A tube forming and filling apparatus, including a conduit for continuously delivering the filling material, means for delivering wrapper material lengthwise of and outside of said conduit to form the tube, and constantly acting means yieldingly pressing the conduit endwise in the direction of delivery of the material therethrough.

11. A tube forming and filling apparatus, including a nozzle for delivering the filling material, a guide encircling said nozzle and spaced therefrom, means for delivering wrapping material around said nozzle and lengthwise thereof within said guide, and means for yieldably moving said nozzle endwise in respect to the guide and in the direction of delivery of the filling material and wrapping tube.

12. A tube forming and filling apparatus, including a conduit for delivering the filling material, a pair of rollers each having a groove encircling the same, said rollers being disposed upon opposite sides of said conduit, and the surfaces of the grooves being spaced from said conduit, and means for delivering wrapping material between said rollers and outside of and along said conduit.

13. A tube forming and filling apparatus, including a conduit for delivering the filling material, and a pair of rollers disposed upon opposite sides of said conduit and spaced from the conduit, said rollers having flanged portions at the opposite sides of said grooves for engaging the marginal portions of wrapping material and forming flanges thereon during the advancement of the wrapping material around said conduit.

14. A tube forming and filling apparatus, including a conduit for delivering the filling material, means for delivering two separate strips of wrapper material lengthwise of said conduit upon opposite sides thereof, means for bending said strips to form substantially semi-cylindrical portions disposed upon opposite sides of said conduit and forming the wrapper tube, means for bending one edge portion of each strip outwardly to form separate tabs or flaps on opposite sides of the wrapper tube, and means for gripping said tabs or flaps to continuously advance the tube as the latter is formed.

15. A tube forming and filling apparatus, including a conduit for delivering the filling material, means for delivering two separate strips of wrapper material lengthwise of said conduit upon opposite sides thereof, means for bending said strips to form substantially semi-cylindrical portions disposed upon opposite sides of said conduit and forming the wrapper tube, with one edge of each strip overlapping an edge of the other strip, and means to gradually reduce the diameter of the tube by increasing the overlapping of the edges of the strips.

16. A tube forming and filling apparatus, including means for delivering two separate strips of wrapper material, means for bending each of said strips to approximately semi-cylindrical form with each strip presenting one outwardly projecting marginal edge, said marginal edge of one strip being on the opposite side of the tube from said marginal edge of the other strip, and guide means for progressively reducing the radius of curvature of the strips and increasing the overlapping of the strips at their edges.

17. A tube forming apparatus including means for delivering two separate strips of wrapper material, means for bending each of said strips to approximately semi-cylindrical form with an outwardly projecting marginal edge, guide means for progressively reducing the radius of curvature of the strips and increasing the overlapping of the strips at their edges, and means for gripping said projecting edges to advance the tube endwise.

18. A tube forming and filling apparatus, including a normally substantially stationary conduit for delivering the filling material, means for delivering strips of wrapping material lengthwise of and around said conduit to form the tube to be filled, means beyond the end of said tube for engaging the wrapping material to advance the latter with the filling material therein, independently of the delivery of the material and means for stopping said advancing means upon inadequate supply of material through said conduit to fill the wrapper tube.

19. A tube forming and filling apparatus, including a conduit for delivering the filling material, means for forming a tube of wrapping material around said conduit and advancing the same along the conduit, said conduit being mounted to float back and forth axially in accordance with the pressure developed in the tube, and means for shutting off supply through said conduit upon the axial movement of the tube outwardly to a predetermined point.

20. A tube forming and filling apparatus, including a conduit for delivering the filling material, means for forming a tube of wrapping material around said conduit and advancing the same along the conduit, said conduit being mounted to float back and forth axially in accordance with the pressure developed in the tube, means for shutting off supply through said conduit upon the axial movement of the tube outwardly to a predetermined point, and means for resupplying the material through the conduit upon the endwise movement of the tube in the opposite direction to a predetermined point.

21. A tube forming and filling apparatus, including a conduit for delivering the filling material, means for forming a tube of wrapping material around said conduit and advancing the same along the conduit, said conduit being movable back and forth axially as the rates of advancement of the material and the tube vary, and means for controlling the supply of material through said conduit in accordance with the axially adjusted position of the conduit.

22. A tube forming and filling apparatus, including a conduit for delivering the filling material, means for forming a tube of wrapping material around said conduit and advancing the same along the conduit, said conduit being movable back and forth axially as the rates of advancement of the material and the tube vary, means for yieldingly pressing the conduit axially in the direction of movement of the material and wrapper tube, a valve for controlling the flow of material through said tube, and means for opening said valve when the conduit has been moved axially in one direction to a predetermined position, and closing said valve when the conduit has been moved axially in the opposite direction to a predetermined position.

23. The method of packaging material, which includes delivering the material through an open-ended conduit, forming a tube of wrapping material around said conduit, continuously advancing said tube over the conduit, and maintaining a substantially constant pressure on the material in the tube by moving said conduit back and forth endwise in accordance with the rate of delivery of the material therefrom into the formed tube.

24. The method of forming and wrapping plastic material, including continuously delivering the material through an open ended conduit at a substantially uniform rate, continuously delivering wrapper material lengthwise of said conduit, bending the body portion of said wrapper material to tubular form around said conduit, bending the marginal portions of said wrapper material to form longitudinal flaps, and continuously and progressively engaging said flaps to advance them and continuously slide the tubular wrapper off the end of said conduit at substantially the same rate that the plastic material is delivered from said conduit.

25. The method of packaging material, which includes delivering the material through an open-ended conduit, progressively bending a pair of strips of wrapping material to form a tube around but larger than the conduit, advancing the tube endwise along the conduit, and progressively decreasing the diameter of the tube until its inside diameter is substantially the outside diameter of the conduit.

26. The method of packaging material, which includes delivering the material through an open ended conduit, forming a tube of wrapping material around said conduit, continuously advancing said tube in respect to the conduit, and maintaining the pressure in the tube substantially constant by moving the conduit forward as the pressure decreases, and backward as the pressure increases.

27. A tube forming and filling apparatus, including a conduit for delivering the filling material, means for forming a tube of wrapping material around said conduit and advancing the same along the conduit, said conduit having flexible connections to its source of supply permitting said conduit to move axially, and constantly acting yielding means for pressing the conduit endwise in the direction of movement of the tube.

28. A tube forming and filling apparatus, including a conduit for delivering the filling material, means for forming a tube of wrapping material around said conduit and advancing the same along the conduit, said conduit having flexible connections to its source of supply permitting said conduit to move axially, constantly acting yielding means for pressing the conduit endwise in the direction of movement of the tube, a valve for controlling the supply of material through said conduit, and means for operating said valve to reduce the flow through said conduit when the conduit has been moved rearwardly to a predetermined position.

29. A tube forming and filling apparatus, including a conduit for delivering the filling material, means for forming a tube of wrapping material around said conduit and advancing the same along the conduit, said conduit having flexible connections to its source of supply permitting said conduit to move axially, constantly acting yielding means for pressing the conduit endwise in the direction of movement of the tube, and means for stopping the advancement of the tube when the conduit has been moved forward to a predetermined position.

30. A tube forming and filling apparatus, including a conduit for delivering the filling material, and means for delivering wrapper material and bending it to form a tube around said conduit, said conduit having a valve controlled outlet intermediate of its ends whereby excess filling material may escape and the rate of delivery of the material from the end of the conduit may be controlled in accordance with the rate of delivery of the wrapper material.

31. A tube forming and filling apparatus, including a conduit for the continuous delivery of filling material at a substantially uniform rate, means for delivering separate strips of wrapper material lengthwise of the conduit and bending them to form a tube completely encircling the conduit, the edges of each strip overlapping the edges of the other strip, and edge portions of said strips forming tabs adapted to be gripped and pulled apart to remove the wrapper material, and means engaging said tabs to advance the tube endwise.

32. A tube forming and filling apparatus, including a conduit for the continuous delivery of filling material at a substantially uniform rate, means for delivering separate strips of wrapper material lengthwise of the conduit and bending them to form a tube completely encircling the conduit, each strip covering slightly more than one half of the circumference of the conduit with each edge of each strip overlapping the adjacent edge of the other strip, and means for engaging edge portions of said strips to pull the strip through said delivering and bending means and to pull said tube off the end of said conduit.

33. A tube forming and filling apparatus, including a conduit for the continuous delivery of material at a substantially uniform rate, means for delivering separate strips of wrapper material lengthwise of said conduit and bending said strips to form a tube encircling said conduit and to form tabs along opposite sides of the tube, and means for engaging said tabs to continuously advance the filled tube from the end of said conduit.

CLARENCE W. VOGT.